May 22, 1923.
R. E. BAUS
1,456,173
SYSTEM FOR LOADING AUTOMOBILES IN FREIGHT CARS
Filed March 15, 1918
4 Sheets-Sheet 2
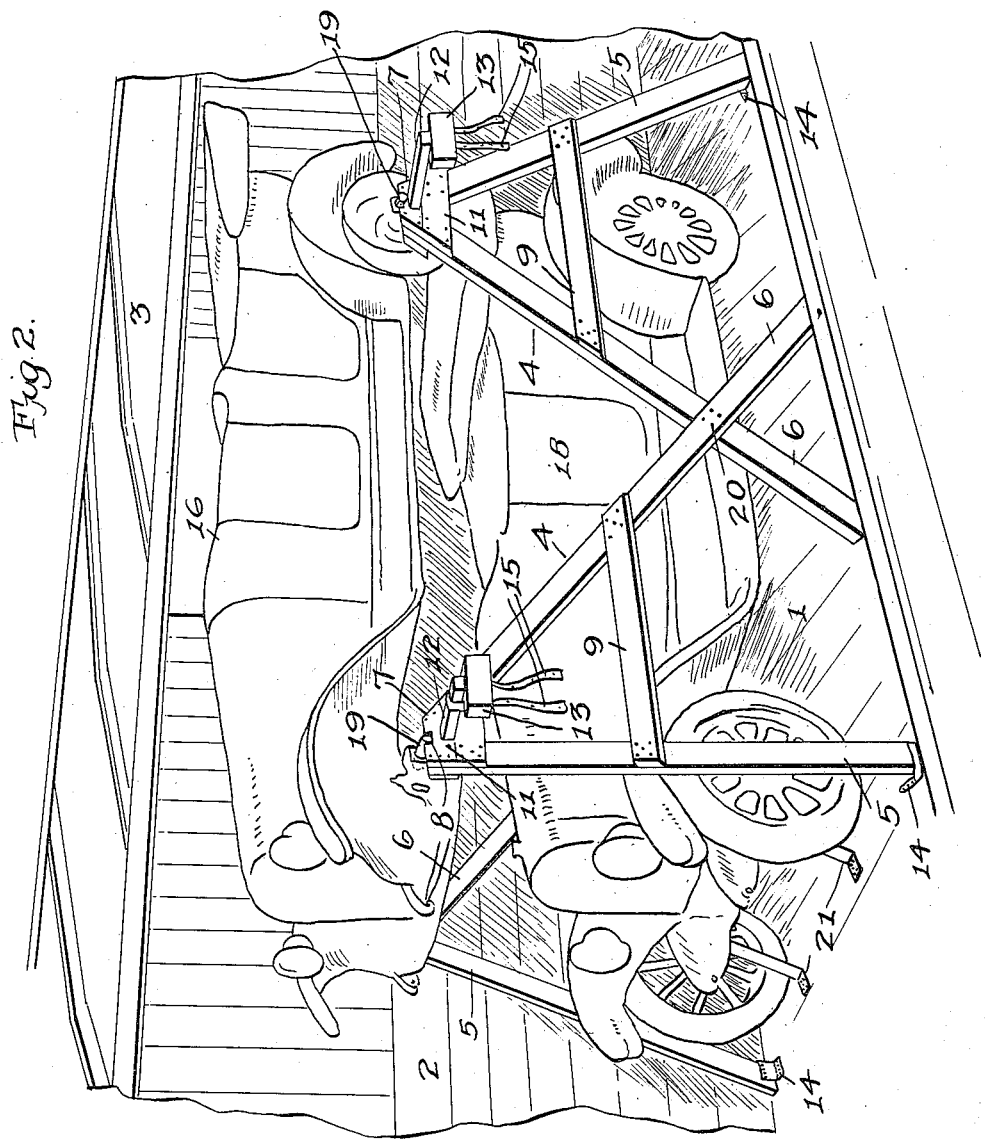

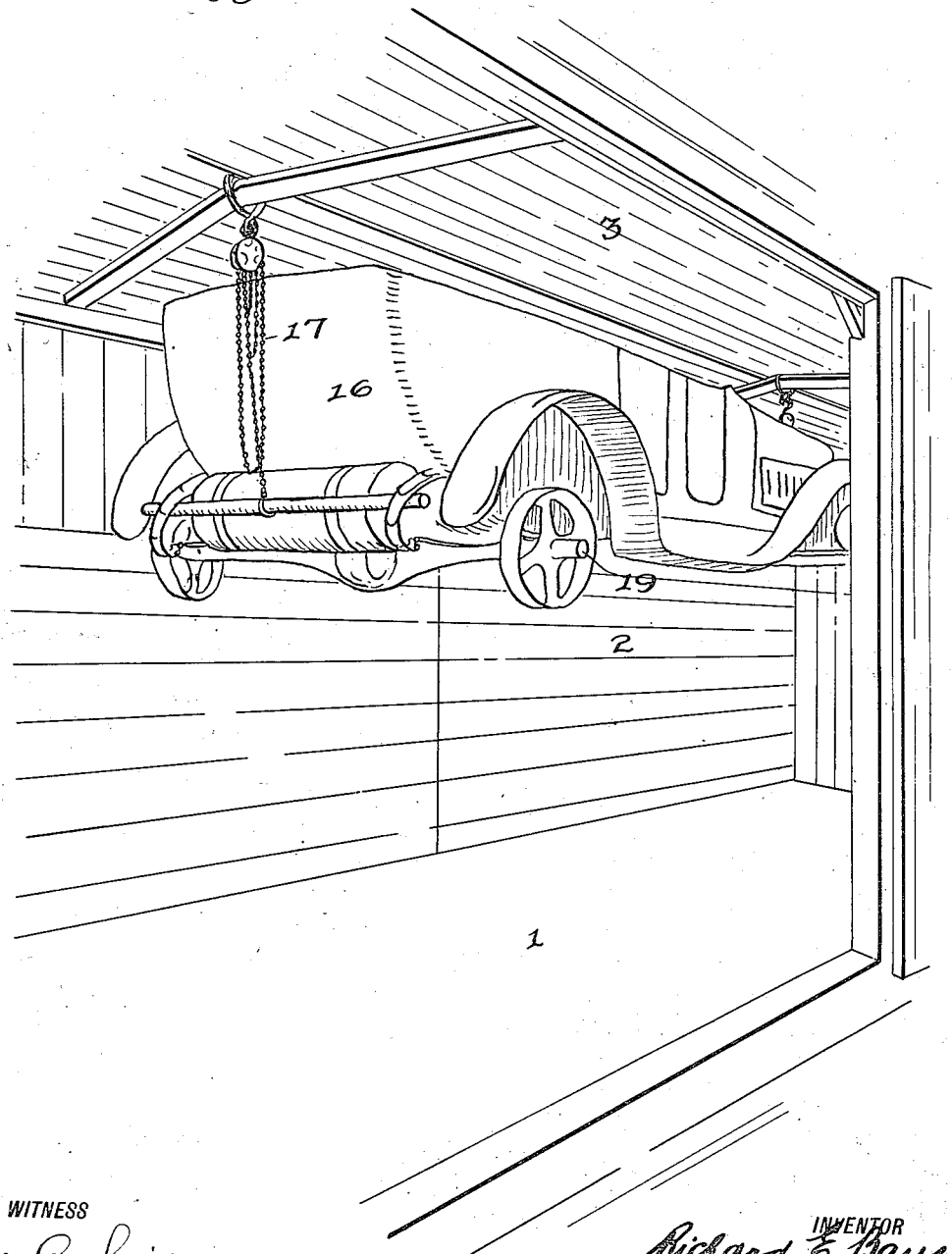

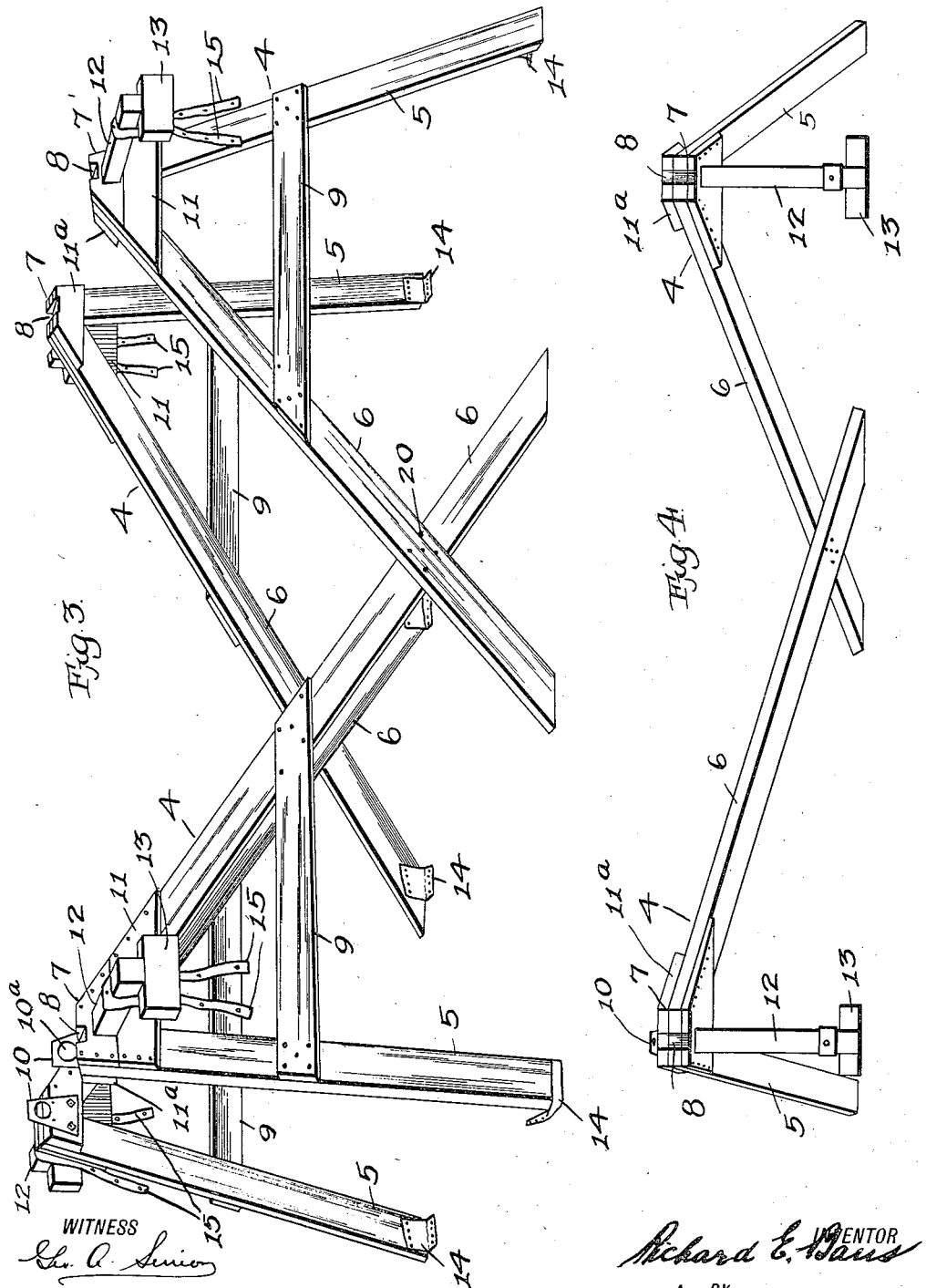

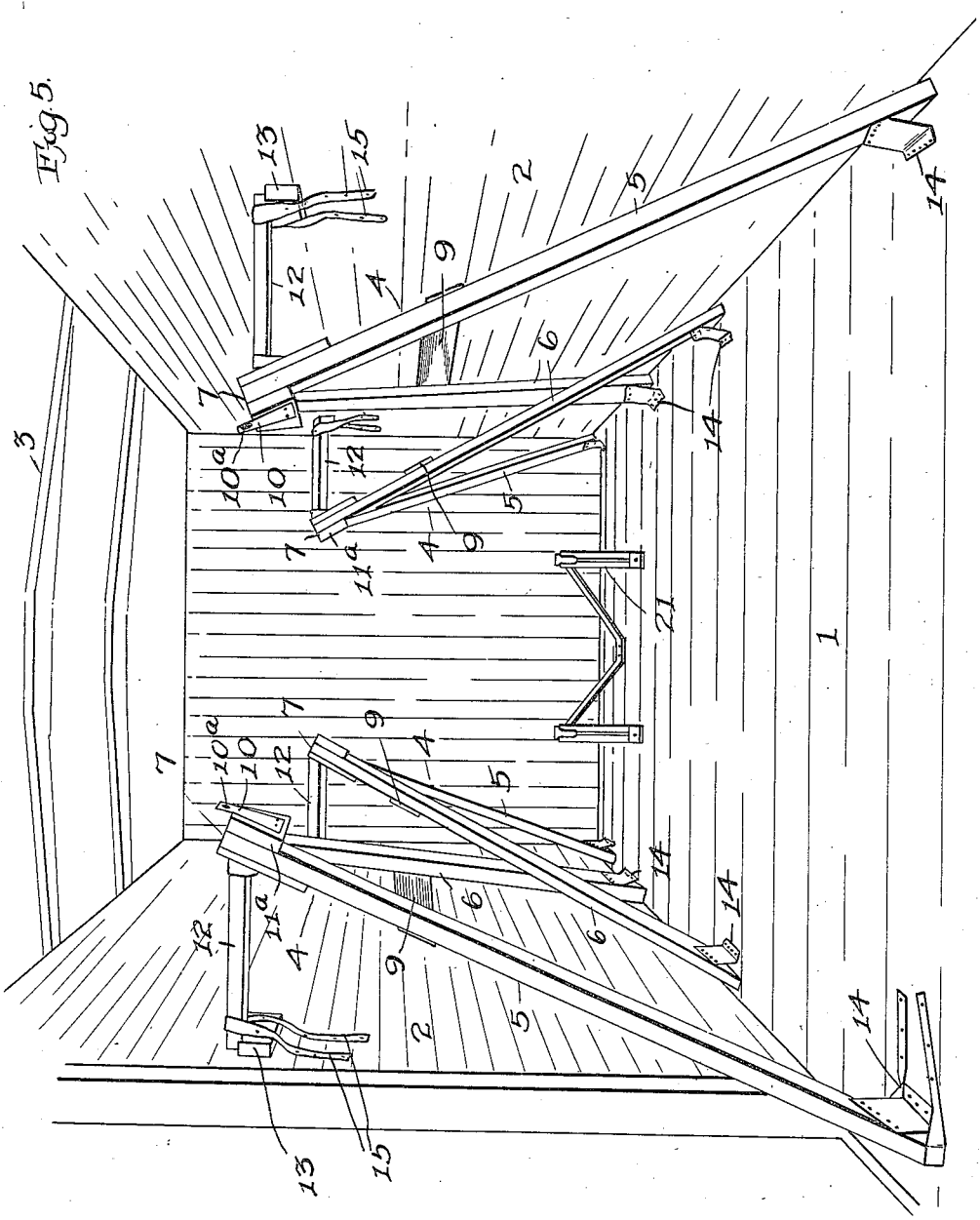

Patented May 22, 1923.

1,456,173

UNITED STATES PATENT OFFICE.

RICHARD E. BAUS, OF DETROIT, MICHIGAN, ASSIGNOR TO THE STUDEBAKER CORPORATION, A CORPORATION OF NEW JERSEY.

SYSTEM FOR LOADING AUTOMOBILES IN FREIGHT CARS.

Application filed March 15, 1918. Serial No. 222,583.

*To all whom it may concern:*

Be it known that I, RICHARD E. BAUS, a citizen of the United States of America, and resident of Detroit, in the county of Wayne and State of Michigan, have invented certain new and useful Improvements in Systems for Loading Automobiles in Freight Cars, of which the following is a specification.

My invention relates to an improvement in a system for loading, supporting and securing automobiles in a freight car for the purposes of shipment. My system contemplates the idea of supporting the automobiles in two tiers so that one automobile is secured directly to the floor of the car while another automobile is suspended between the floor and the roof of the car, such suspending means being so constituted as to leave clearance for the introduction of an automobile adjacent the floor and to provide means by which said suspended automobile is supported and braced against longitudinal and transverse strain incident to the movement of the car.

I have illustrated my system in the accompanying drawings, designating the parts by numerals, referring to like parts by like numerals.

Figure 1 is a perspective view illustrating means for hoisting the automobile adjacent the roof of the car in position to be lowered down on to the supporting means hereinafter described.

Figure 2 is a perspective view with one side of the car removed showing two automobiles mounted in a freight car one supported adjacent to the floor and the other adjacent the roof of the car and between the automobile supported adjacent the floor and said roof.

Figure 3 is a perspective view showing the supporting and bracing means employed to suspend the automobile adjacent the roof.

Figure 4 is a plan of two of the triangular supporting members and accompanying braces. The opposite two supporting members are in all respects similar to those illustrated in Figure 4, except that they are reversed in their inclination.

Figure 5 is an end view in perspective of the car showing my bracing members in position to receive a car.

The structures employed in carrying out my system may be described as follows: 1 is the floor of the car, 2—2 the side walls, while 3 is the roof of the car, 4 indicates one of four triangular forms, each form comprising two legs as 5 and 6 suitably beveled at their ends to conform to the level of the floor and at their point of union forming the apex of the triangular form as 7. I prefer that they should be suitably braced as at 9 and 11 and 11$^a$. I prefer that the legs 5 should be approximately vertical while the legs 6 should be longer and have an inclination as indicated. In the apex of the triangle 7 I form an aperture or recess 8 adapted to receive the ends of the axles of the automobile as 19, Figure 2. I find it convenient also to provide the members 10 each having an aperture 10$^a$ therein to receive the axle.

In mounting these triangular members in the car I place two of them on one side of the car adjacent the wall and two on the other side adjacent the opposite wall so adjusting the triangular members that the longer legs 6—6 are adjacent, and secure all of said legs to the floor by any convenient means, as for instance, the bands 14, the space between said triangular members being sufficient to accommodate an automobile which may be introduced between them.

In operation the automobile to be suspended is hoisted by suitable means as for instance the block and tackle 17, one at each end of the same, to a point adjacent the roof of the car. The triangular members 4 are then tilted toward the center of the car and in position to receive the end of the axle of said suspended car as 19 into the apertures or recesses 8, in which case the axle passes through the aperture 10$^a$ of the supporting member 10. When in this position the block and tackle 17 is released and the car is permitted to rest on its axles in the aperture 8 at the apex 7 of the triangular members 4. I then interpose four struts as 12 between the apex of the triangular form and the adjacent wall of the car. 13 is a block adapted to be secured to the wall of the car and operate to support said struts 12, which is also suitably secured to the triangular form. 15 are metallic braces adapted to aid in securing the said struts to the wall of the car. At 20 I secure the legs 6—6 together.

In the drawing, Figure 5, I have shown at 21 a construction for supporting an automobile in a freight car adjacent the floor which I fully described and claimed in my United States Letters Patent dated August 14th, 1917, No. 1,237,154; consequently the same needs no further description here.

The desirability of being able to ship automobiles with safety so packed in a freight car as to economize space to the minimum has been obvious to engineers engaged in this work. The problem involved handling an apparatus so cumbersome in its parts, delicate in its mechanism, and with its weight variously distributed has presented many difficulties. It is the object of my present invention to solve these problems effectively and with economy. One of the features of my construction is that I employ lumber of standard sizes and the construction is of a nature that may be erected by unskilled labor at a minimum of cost and which when constructed is so adjusted as regards its ability to resist the longitudinal and transverse strains incident to the movement of a car as to accomplish the object desired, for instance, the weight of the car is largely borne by the almost vertical legs 5, whereas the longitudinal thrust as when the car is started or suddenly stopped is met by the legs 6, whereas the transverse strain as when the car is negotiating a curve is taken up by the struts 12.

Another advantage of the construction is found in the fact that when the automobile is delivered at its point of destination the structure described may be knocked down and shipped back to the factory where it can be readily put together again for purposes of subsequent shipment. All of these are advantages of prime importance in the solution of the problem above recited.

What I claim is:

1. A system for packing automobiles in a freight car for shipment comprising means for suspending an automobile within said freight car in a way to provide clearance for the accommodation of a second automobile beneath the first, said means comprising four triangular forms each having two legs, one leg of each form being longer than the other, an aperture at the apex of each triangular form, to receive one end of an axle, two of said forms mounted on one side of the car and two on the other adjacent the respective walls of the car and parallel therewith, the adjacent legs of the forms on each side of the car being the longer legs with means to secure said legs together and means to secure all of said legs to the floor of the car, said triangular members as mounted on said floor being sufficiently separated at their base to allow space for the introduction between them of a second automobile, means to elevate an automobile to a point at which it is to be suspended, said triangular forms being tilted inwardly so that their apexes are beneath the ends of the axles of the automobiles, struts interposed between the apexes and the walls of the car to brace said forms and the automobile suspended thereon against transverse movement and means to secure said struts in position as and for the purposes specified.

2. The combination with a freight car, of means for suspending an automobile therein to provide clearance for a second automobile beneath the first, said means comprising a triangular brace member forming a triangular brace in both vertical and horizontal planes.

3. In a decking system for automobiles or the like in freight cars, the combination with a brace member extending diagonally upward from the floor of the car and inwardly from the side thereof, of a transverse brace member co-operating with said first mentioned brace member.

4. In a system for loading and securing automobiles in a freight car comprising four supporting members braced longitudinally of the car and secured to the floor thereof and situated to support each one end of each axle with clearance space between said supporting members to admit another automobile, braces interposed between the wall of the car and the top of said supporting members to resist transverse strain.

5. In a system for loading and securing automobiles in a freight car comprising four supporting members braced longitudinally of the car and secured to the floor thereof and situated to support each one end of each axle, said supporting members adapted to support one side of the automobile secured together and those supporting the opposite side secured together in like manner, with clearance space between said supporting members to admit another automobile, braces interposed between the wall of the car and the top of said supporting members to resist transverse strain.

6. In a system for supporting and securing automobiles in a freight car comprising a plurality of supporting members one for the ends of each of the two axles, means to brace said supporting means against longitudinal and transverse strain due to the movement of the car, said supporting members being of a form to provide clearance for a second automobile beneath the one supported thereby.

7. In a system for supporting and securing automobiles in a freight car, comprising a plurality of supporting members one for the ends of each of the two axles, means to elevate the automobile to place the same in position on said supporting members, means to brace said supporting members against longitudinal and transverse strain due to the movement of the car, said supporting members being of a form to provide clearance for a second automobile beneath the one supported.

8. In a system for supporting and securing automobiles in freight cars, comprising a plurality of supporting members one for the end of each of the axles, said supporting members being in the form of a tripod and so situated as to brace the supported axle in three directions, said supporting members also being of a form to provide clearance for a second automobile beneath the automobile supported.

9. In a system for supporting and securing an automobile in a freight car in a manner to permit the loading of a second automobile beneath the one so supported comprising an automobile with the wheels removed, a plurality of supporting members one for the end of each of the axles of said automobile, said supporting members being in the form of a tripod and so situated as to brace the supported axle in three directions, said supporting members also being of a form to provide clearance for a second automobile beneath the automobile thus suspended.

10. In a system for supporting and securing an automobile in a freight car in a manner to permit the loading of a second automobile beneath the one so supported comprising an automobile with the wheels removed, a plurality of supporting members one for the end of each axle of said automobile, said supporting means braced to resist longitudinal strain and of a form to provide clearance space for a second automobile beneath the one suspended, with means to brace said supporting members against strain tranverse of the car.

11. A structure for loading freight cars with automobiles, having in combination, a pair of inclined frames adapted to support the automobile at the top which acts as a tie between the two halves of substantially a longitudinally split horse.

12. A structure for loading freight cars with automobiles, having in combination, a pair of horse frames forming in effect a longitudinally split horse with the split portions joined at the top by the automobile which they support, and struts between the legs of the horse and the side walls of the freight car.

13. A structure for loading freight cars with automobiles, comprising a skeleton work forming a longitudinally running cradle of substantially the width of the automobile, and inclined legs running from the sides of the cradle to the corners of the freight car floor and sides of the freight cars.

Signed by me at Detroit, Michigan, this 11th day of March, 1918.

RICHARD E. BAUS.

Witnesses:
 WARREN C. RUPP,
 RAY C. GAMBLE.